May 3, 1960
H. P. ZARTLER
2,934,805
HOSE CLAMP CONSTRUCTION
Filed Dec. 17, 1957
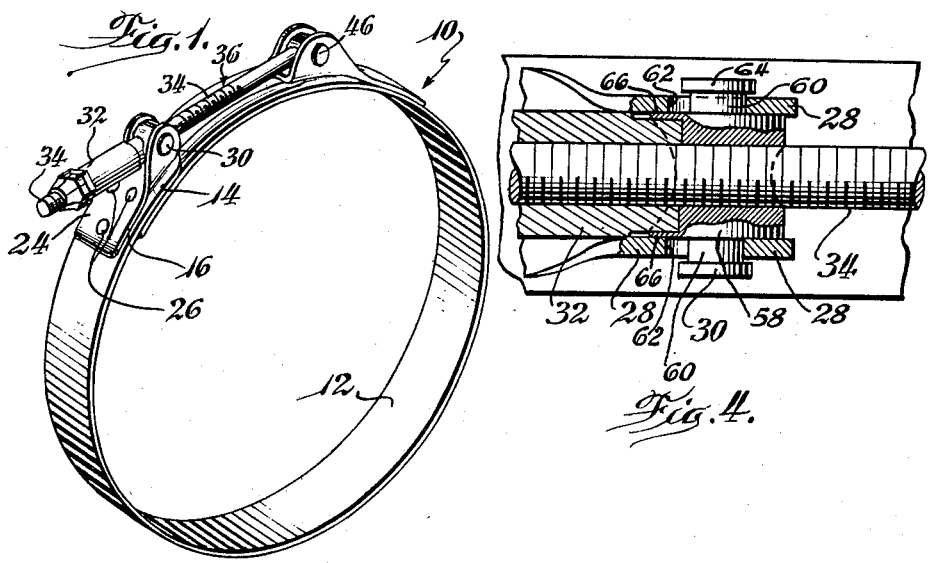
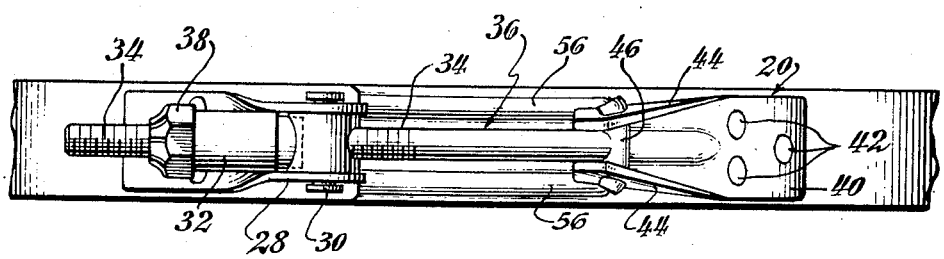
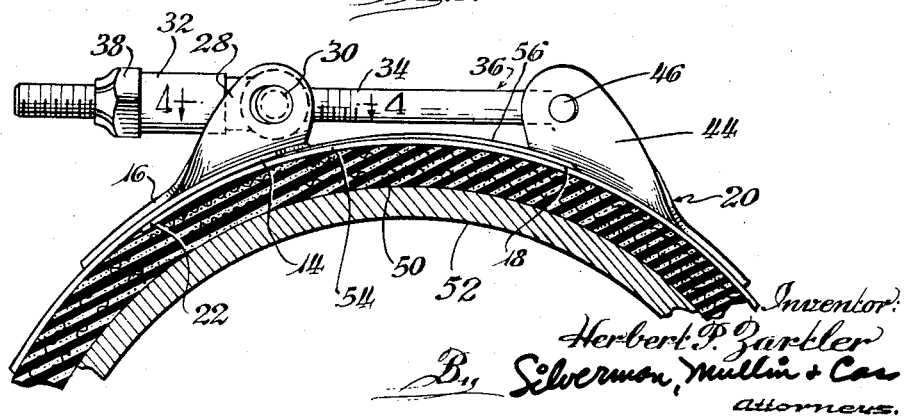
Inventor:
Herbert P. Zartler
By Silverman, Mullin & Cass
Attorneys.

United States Patent Office 2,934,805
Patented May 3, 1960

2,934,805

HOSE CLAMP CONSTRUCTION

Herbert P. Zartler, Hillside, Ill., assignor to Wittek Manufacturing Co., Chicago, Ill., a corporation of Illinois Application December 17, 1957, Serial No. 703,443

4 Claims. (Cl. 24—279)

This invention relates generally to hose clamps and more particularly, relates to novel improvements in a hose clamp of the character described whereby increased strength of certain components of the hose clamp is realized with attendant important advantages.

In hose clamps of the general type with which this invention is concerned, there is employed a metal band or strap having separable ends, the band being flexible and having a variable length connector member connected between the ends thereof which enables the diameter of the band to be reduced to tightly engage the same around a pair of coupled conduits. Such a connector member may take the form of a substantially T-shaped bolt or screw and the ends of the band are provided with suitable retainer formations for connecting said bolt or screw in operational position. In my U.S. Patent 2,724,885 there was disclosed a hose clamp of this general construction in which the T-portion of the connector member was releasably engaged in a bolt retainer formation termed a coupler member. In my co-pending application Serial No. 703,444, filed December 17, 1957, for the invention entitled "Hose Clamp Construction," there is shown another clamp of this general type in which the T-portion of the bolt may be permanently attached in a bolt retainer member. The second retainer formation is called a trunnion retainer and it is with this part of the hose clamp that this invention is concerned.

As can be understood from my patent and co-pending application, such a trunnion retainer usually is formed with a flat base portion having a pair of laterally spaced, upstanding ears thereon which are relatively parallel. Said ears are apertured and supported therebetween is a trunnion member through which the longer leg of the T-shaped connector member is slidably engaged. The trunnion member usually is pivotally mounted at its ends in said aperture on an axis transverse to the longer leg of the connector member. As the clamp is tightened, the connector member is placed under tension with the ends of the trunnion member bearing against edgewise portions of the ears of the trunnion retainer. Under conditions of extreme tension as commonly is occasioned in the use of this type of hose clamp, there is some tendency for the ears of the trunnion retainer to be spread one relative the other, enabling the trunnion member to be shifted laterally relative the bolt retainer member of the hose clamp or be pulled out from between the ears to unlock the clamp.

The primary object of this invention is to provide a hose clamp of the character described in which special structural features are embodied to prevent the ears of the trunnion retainer member from being spread even under extreme conditions of tension in which the connector member is placed.

Another object of the invention is to provide a hose clamp of the character described in which the trunnion member has means integral therewith for preventing such relative spreading of the ears of the trunnion retainer member.

Another object of the invention is to provide a hose clamp as described in which said means on the trunnion member comprise enlarged formations at the extremities thereof disposed exterior of the ears of the trunnion retainer member and said formations resist the spreading of said ears even under extreme tension conditions.

A further object of the invention is to provide a hose clamp as described in which said trunnion member has shoulder formations cooperating with said enlarged formations to resist or prevent such spreading of the ears of the trunnion retainer.

Other objects of the invention will become apparent from the ensuing description in which a preferred embodiment has been described in detail and illustrated in the accompanying drawing comprised of the following figures:

Fig. 1 is a perspective view of a hose clamp of the general type with which the invention is concerned and in which the improvements embodying the invention are shown.

Fig. 2 is an enlarged top plan view of the hose clamp embodying the invention.

Fig. 3 is a sectional view taken through a pair of coupled conduits and showing clamp in operational position engaged around the conduits.

Fig. 4 is a sectional view taken along the line 4—4 of Fig. 3 and in the direction indicated.

Referring to Fig. 1, the hose clamp embodying the invention is designated generally by the numeral 10, this clamp embodying certain novel features of construction which are the subject matter of other co-pending applications to which reference may be had. Strap or band 12 is formed of flexible metal and has a pair of separable ends, one end 14 having a trunnion retainer member 16 secured thereon. The second effective end 18 of the band has a bolt retainer member 20 secured thereon. As explained in co-pending application Serial No. 703,403, filed December 17, 1957, for my invention entitled Hose Clamp Band, the end 14 is one physical end of the band 12 whereas end 18 is the effective end thereof which is spaced from the actual physical end 22 of the band to provide the extender 54 which is provided with strengthening ribs 56.

Trunnion retainer 16 preferably is an integral metal member having a flat base portion 24 secured on the band as by welding 26, and a pair of relatively parallel, laterally spaced ears 28 upstanding on said base. The ears are journal formations for a trunnion member designated generally by the reference character 30, which is constructed in accordance with this invention. It will be noted that trunnion 30 has a bushing or stem 32 associated therewith, and both are bored to provide a passageway transverse to the vertical disposition of ears 28.

Extending through the trunnion 30 and bushing 32 is the shank 34 of an elongated T-bolt 36 with the threaded end of said shank mounting a nut 38. The T-bolt 36 and retainer member 20 preferably are constructed in accordance with the invention described in my co-pending application Serial No. 703,444, filed December 17, 1957, entitled Hose Clamp Construction, although other structures therefor are feasible with this invention. Bolt retainer 20 is an integral metal stamping having a base portion 40 spot-welded as at 42 on metal strap 12. A pair of generally parallel, upstanding apertured ears 44 support the T-segment 46 of said bolt and the extremities of said segment 46 may be offset as illustrated in Fig. 2 for purposes explained in my said co-pending application.

As seen in Fig. 4, trunnion 30 has a medial cylindrical portion 58 and reduced dimension end formations 60 each received in an aperture 62 provided in each ear 28 of the trunnion retainer 16. The length of each end 60 is sufficient to protrude outwardly of the aperture 62 with which associated and formed on the protruding extremity is an enlarged or mushroom-like formation 64 disposed exterior of and slightly spaced from the adjacent ear 28. Formations 64 may be formed by peaning, swaging, cimping or the like. The formations 60 contribute to shoulders 66 each of which abuts the inner surface of an ear 28 in the mounted position of the trunnion between ears 28. Shoulders 66 prevent the trunnion from shifting laterally. The enlarged formations 64 prevent the reduced dimension ends 60 from being pulled out of apertures 62 by preventing or limiting spreading of said ears 28. Likewise, shoulders 66 cooperate to resist deformation of said ears.

Considering now the use of the hose clamp 10, the band 12 encircles a hose 50 which may be re-enforced with wire mesh in some cases. Hose 50 is telescoped over a conduit or pipe 52 and as nut 38 is taken up to tighten the clamp, the distance between ears 28 and 44 is decreased with resulting tension applied through shank 34 between trunnion 30 and the T-end 46 of the bolt. The end formations 60 bear against edge portions of apertures 62 in ears 28 and under extreme conditions of tension applied through the bolt, there is a tendency for ears 28 to be spread apart. However, because of the enlarged formations 64, such spreading is prevented or resisted. Likewise, shoulders 66 prevent or resist each ear 28 from moving laterally relative the other one by reason of their abutment against the interior surfaces of said ears 28. As a consequence, the trunnion positively is prevented from being pulled out from between the ears even under extreme tension conditions unless failure of the ears or trunnion occurs.

As explained in my co-pending application for Hose Clamp Band, Serial No. 703,403 filed December 17, 1957, when the entire band is under tension, extender portion 54 is provided between effective end 18 and the end 22 which is not so tensed. Instead, extender 54 is under compression, sometimes digging into hose 50 as the diameter of the band 12 decreases. The ribs 56 stiffen the expander and resist outward bowing thereof.

During manufacture of the hose clamp, the trunnion retainer 16 is stamped and probably partially formed with ears 28 spread apart. The trunnion 30 is then disposed in position and the ears bent to their final positions as shown in the drawing. The apertures 62 are of sufficient diameter readily to pass the annular formations 64.

It is believed the invention has been sufficiently described. Variations are contemplated without departing from the broad principles of the invention as set forth in the appended claims.

I claim:

1. A hose clamp of the character described including, a flexible metal band of circular configuration having a pair of separable ends, a variable length connector member connected between said ends for selectively securing the clamp on a hose, a connector member retainer formation mounted on one of said ends engaged with said connector member, a trunnion retainer member mounted on the second end of the band, said trunnion retainer member having a base secured to the band, a pair of spaced apart apertured ears upstanding on said base, a trunnion member having a medial body portion received between said ears, said medial body portion having a shoulder abutting each ear and reduced dimension end portions each extending entirely through one of the apertures in said apertured ears, each end portion having means for preventing spreading of the ears one relative the other when the band is so secured comprising enlarged formations suitably dimensioned so that they may pass through the apertures in the ears, said connector member having an elongate shank slidably engaged through said medial body portion.

2. A hose clamp as described in claim 1 in which said enlarged formations are provided on the outer extremities of said end portions and are spaced from said medial body portion to permit the end portions to engage against edges of said apertures when the clamp is secured.

3. A hose clamp of the character described including, a flexible, circular metal band having a pair of separable ends, a variable length connector member secured between said ends for selectively tightening the band on a hose, a connector member retainer formation mounted on one of said ends with the connector member connected thereto, a trunnion retainer member comprising, a flat base secured upon said second end of the band and having a pair of spaced apart ears upstanding on said base, said ears having aligned apertures, a trunnion member having a cylindrical medial body portion having a diameter greater than that of each aperture and the length of which is substantially equal to the distance between said ears and reduced dimension end portions integral therewith, said medial body portion received between the ears with said end portions etxending axially outward of said body portion, each end portion extending through a said aperture and having means preventing spreading of said ears one relative the other when the band is so tightened, said connector member having an elongate shank slidably engaged through the medial body portion, each end portion being longer than the thickness of the ear through which it is extended, said means comprising formations larger than the end portions but smaller than the apertures so that they may pass freely therethrough, said body portion received between said ears, said formations being disposed exterior of the ears and slightly spaced therefrom whereby to permit movement of the end portions into engagement with edges of the apertures when the clamp is tightened, said medial body portion preventing displacement of the trunnion member from between said ears and the enlarged formations preventing spreading of the ears one relative the other upon tightening of the band.

4. In a hose clamp of the character described having a trunnion retainer member formed with a flat base and a pair of spaced apart apertured ears upstanding upon the base, a trunnion member comprising, a medial cylindrical body of a length slightly less than the distance between said ears and a diameter larger than the diameter of each aperture, said body having reduced diameter ends extending axially outward of the body and adapted each to be receive in a said aperture, button-like formations on the outer extremities of said end portions and spaced from said body a distance greater than the thickness of a said ear, said formations being suitably dimensioned to permit their passage through the apertures with the formations disposed exterior of said ears whereby when the clamp band is placed under tension, said body will bear outwardly against said ears to prevent the trunnion member from being dislodged from between the ears and the formations will bear inwardly one toward the other and against said ears to prevent spreading of the ears one relative the other, said reduced diameter ends adapted to bear against edges of said apertures in said tensioned condition of the clamp.

References Cited in the file of this patent
UNITED STATES PATENTS

| | | |
|---|---|---|
| 2,246,457 | Schultz | June 17, 1941 |
| 2,292,310 | Wilkins | Aug. 4, 1942 |
| 2,724,885 | Zartler | Nov. 29, 1955 |
| 2,806,276 | Cooper | Sept. 17, 1957 |